United States Patent Office 3,290,163
Patented Dec. 6, 1966

3,290,163
FREE FLOWING TREATMENT OF GLASS BEADS
Charles H. Elbreder, Frontenac, Mo., assignor to Chas. Elbreder & Company, Inc., St. Louis, Mo., a corporation of Missouri
No Drawing. Filed Oct. 30, 1963, Ser. No. 319,938
18 Claims. (Cl. 106—288)

This application is a continuation-in-part of my copending application Serial No. 240,158, filed November 26, 1962, and now abandoned.

This invention relates to glass beads and more particularly to compositions and methods for imparting free-flow characteristics to such beads and maintaining such characteristics when the beads are exposed to moisture.

Among the several objects of the invention may be noted the provision of a composition which imparts improved free-flow characteristics to microscopic glass beads normally subject to adsorption of moisture from the atmosphere; the provision of such a composition which is highly useful in maintaining the free-flow properties of microscopic glass beads employed, for example, for application to highway marking paints and sign surfaces, and as the cleaning, polishing, peening or finishing media in dry blast equipment utilized for cleaning metal surfaces; the provision of a composition of the type described which, when intimately mixed together with microscopic glass beads, permits the beads to be uniformly dispensed even under conditions of high humidity; and the provision of a method of maintaining the free-flow characteristics of microscopic glass beads which is simple and economical to practice and gives effective and reliable results. Other objects and features will be in part apparent and in part pointed out hereinafter.

The invention accordingly comprises the products and methods hereinafter described, the scope of the invention being indicated in the following claims.

As is known, microscopic glass beads (i.e., glass beads of small particle size ranging up to about 900 microns in diameter) are widely used for various purposes. For example, such beads are applied to highway marking paints and sign surfaces to produce a reflective surface which improves the night visibility of the resulting paint film or sign surface. For this purpose, the glass beads are dispensed from a hopper or the like and uniform dispensation of the beads is essential for good results. Moreover, small glass beads have found use as the cleaning, polishing, peening, blasting or finishing media in dry blast equipment utilized for cleaning and finishing metal surfaces. For this purpose, the glass beads are dispensed from a supply line through a nozzle supplied with air under pressure.

For these applications and others, it is essential that the free-flowing characteristics of the glass beads be maintained under prevailing atmospheric conditions so that they may be uniformly and continuously dispensed from a hopper, supply line or the like. However, in practice, it has been found that such beads are highly hygroscopic and tend to adsorb or absorb moisture from the atmosphere under humid conditions to such an extent that the beads assume a slushy consistency, become tightly packed and even set up in a hard mass due to cementation. This is due to the physical and chemical characteristics of the glass beads, i.e., the enormous surface area of a body of beads and free alkali in the glass composition. Because of the large surface area, the beads have a tendency to take on moisture by adsorption, absorption, condensation or the like. Depending upon the basic composition of the glass from which the beads are made, the beads may contain a greater or lesser proportion of free alkali which imparts a high pH value to the surface of the beads. It has been my finding that this high pH surface, characteristic of apparently dry beads, exhibits an affinity for atmospheric moisture. Moisture from the atmosphere is thus adsorbed or absorbed and retained on the interfacial surfaces of bulk glass beads causing the beads to lump, cluster or pack and assume a putty-like slushy consistency which, upon subsequent drying, sets up in a hard mass.

In practice, this phenomenon poses a serious problem, especially under conditions of high relative humidity (55% or higher). In the dry blast equipment application previously described, for example, it has been found that the glass beads, after adsorbing or absorbing moisture from the atmosphere or air supply pack in the hopper reservoir, valves and flow lines. This causes either complete inoperation or intermittent operation of the equipment, and necessitates removal and replacement of the packed glass beads or the installation of special equipment to supply substantially dry air to the dry blast machine. Similarly, in applying small glass beads to highway marking paints, it has been found that the beads, upon adsorbing or absorbing moisture from the atmosphere, pack in the hopper from which the beads are dispensed and thereby interfere with or prevent uniform flow of beads from the hopper.

In accordance with the present invention, it has now been found that the free-flow characteristics of small glass beads may be maintained, even under conditions of high humidity, temperature and pressure, by intermixing therewith particles of a finely divided nonhygroscopic, inorganic material having a slurry pH of less than approximately 9.0. It is believed that the method and compositions of this invention operate to maintain the free-flow characteristics of small glass beads by neutralizing, conditioning and adjusting the pH characteristics of the surface of the glass beads so that moisture is no longer adsorbed or absorbed and retained on the surface of the beads. Thus, it is believed that the methods and compositions of the invention continuously buffer and adjust the apparent interfacial surface pH value of glass beads when exposed to atmospheric moisture and high humidity conditions and thereby eliminate or minimize the hygroscopicity of the beads and maintain the desired free-flow characteristics thereof.

In the presence of moisture, free alkali is leached from the surface of microscopic glass beads, i.e., beads having an average particle size of 900 microns or less in diameter. This leaching action is continuous and imparts a high pH characteristic to the surface of the beads which is not subject to a one-time neutralization. This was experimentally demonstrated as follows: 10 ml. of distilled water was added to 10 grams of small glass beads to form a slurry having a pH of 10.1. The slurry was then acidified with 1% hydrochloric acid solution to a pH of 2.0. The resulting slurry was washed 5 times with distilled water and dried in a drying oven at 100° C. 10 ml. of distilled water was added to the dry beads from the oven, and the pH of the resulting slurry was found to be 9.6.

Through the present invention, the free alkali leached from the surface of small glass beads in the presence of moisture is neutralized, combined, adsorbed or absorbed with the result that the desired free-flow characteristics of the beads are effectively maintained. As mentioned, this is accomplished by intermixing the beads with particles of a finely divided; nonhygroscopic, inorganic material having a slurry pH of less than approximately 9.0. Also, in accordance with the invention, the material does not form an objectionable film on workpieces treated with glass beads with which the additive material has been intermixed. It has been found that materials exhibiting these particular properties are highly useful in the practice of the invention. The material employed must be nonhygroscopic so that it will not itself adsorb or absorb moisture from the atmosphere under conditions of high humidity and thereby contribute to the leaching action described above. The material utilized should also be finely divided and have an average particle size substantially smaller than that of the glass beads being treated, i.e., an average particle size approximately 10–15 microns or less in diameter. Preferably, the average particle size of the material used is 5 microns or less in diameter. Further, the material employed should have a slurry pH of less than approximately 9.0 as determined by measuring the pH of a slurry formed by adding 10 grams of the material to 10 ml. of distilled water.

Among the inorganic materials having the above described properties which have been found useful in the practice of the present invention may be mentioned magnesium aluminum silicate, silicon dioxide, barium sulfate, magnesium trisilicate, aluminum silicate, titanic dioxide, calcium silicate and triacalcium phosphate. These compounds have the following slurry pH values determined on the basis mentioned above.

| Compound: | Slurry pH |
| --- | --- |
| Magnesium aluminum silicate | 7.0–9.0 |
| Silicon dioxide | 3.7 |
| Barium sulfate | 4.2 |
| Magnesia trisilicate | 8.8 |
| Aluminum silicate | 5.3 |
| Titanium dioxide | 6.2 |
| Calcium silicate | 8.9 |
| Tricalcium phosphate | 6.7 |

It will be understood that other finely divided, nonhygroscopic, inorganic materials having a slurry pH of less than approximately 9.0 may be used in the practice of the invention, and that mixtures of such materials are likewise suitable for use in carrying out the invention.

The addition of as little as 0.1% by weight, based upon the weight of the glass beads, of one of the above materials or a mixture of such materials, suffices to impart the desired free-flow characteristics to the beads. Preferably, between 0.01% and 0.1% by weight, based upon the weight of the glass beads, of one of these materials or a mixture of the materials is employed for best results. Although not necessary, it will be understood that higher amounts may be used if desired.

The invention may be carried out by adding one of the above materials or a mixture of such materials to glass beads of small particle size by simple tumbling or intimate mixing to insure that the material or mixture of additive materials is uniformly distributed throughout the beads.

In the preferred form of the invention, a composition containing a mixture of finely divided magnesium aluminum silicate and finely divided silicon dioxide is utilized for imparting free-flow characteristics to glass beads. Preferably, it has been found that the magnesium aluminum silicate should be ground to an average particle size of 0.32 micron or less in diameter and that the silicon dioxide used should have an average particle size of 0.4–5 microns or less in diameter. For example, magnesium aluminum silicate having an average particle size of approximately 0.14 micron in diameter, a bulk density of 19–21 lbs./cu. ft. and a slurry pH of 7.5–9.0 has been found to give good results. Another commercially available form of this product having an average particle size of 0.32 micron in diameter, a bulk density of 12–15 lbs./cu. ft. and a slurry pH of 7–8 also gave good results. It will be understood that other forms of finely divided magnesium aluminum silicate, preferably having an average particle size of 0.32 micron or less in diameter may also be employed. A form of silicon dioxide which has been found satisfactory in the practice of the invention is a silica aerogel consisting of 93–96% $SiO_2$ and having an average particle size of 0.4–5 micron in diameter, a bulk density of 5–6 lbs./cu. ft. and a slurry pH of 3.7. It will be understood that other forms of finely divided silicon dioxide, preferably having an average particle size of 5 microns or less in diameter, may also be used.

It has been found that compositions containing between approximately 60% and 95% by weight of finely divided magnesium aluminum silicate and between approximately 5% and 40% by weight of finely divided silicon dioxide are particularly useful in the practice of the invention.

Materials having the properties specified above, when intimately mixed together with a quantity of small glass beads, impart improved free-flow characteristics to the beads even when the beads are exposed to humid atmospheric conditions. The practice of the invention thus maintains the desirable free-flow characteristics of substantially dry glass beads of small particle size throughout the period of their exposure to humid or moist atmospheric conditions, and thus permits the beads to be continuously dispensed from a hopper or the like, without packing, lumping or clustering.

The following examples illustrate the invention.

*Example 1*

To a quantity of small glass beads (having an average particle size of less than 900 microns in diameter) was added 0.05% by weight (0.8 ounce per 100 pounds of beads) of magnesium aluminum silicate which had been milled to an average particle size of 0.14 micron in diameter and which had a slurry pH of 7.5. The glass beads and the magnesium aluminum silicate were intimately mixed together. It was found that the magnesium aluminum silicate imparted improved free-flow characteristics to the beads and that the beads remained free-flowing even when exposed to 65% relative humidity at a temperature of 80° F. for a period of 24 hours or longer.

*Example 2*

To a quantity of small glass beads (having an average particle size of less than 900 microns was added 0.025% by weight (0.4 ounce per 100 pounds of beads) of silicon dioxide having an average particle size between 0.4 and 5 microns in diameter and a slurry pH of 3.7. The glass beads and the silicon dioxide were intimately mixed together. It was found that the silicon dioxide imparted improved free-flow characteristics to the beads and that the beads remained free-flowing even when exposed to 65% relative humidity at a temperature of 80° F. for a period of 24 hours or longer.

*Example 3*

To a quantity of small glass beads (having an average particle size of less than 900 microns in diameter) was added 0.1% by weight (1.6 ounces per 100 pounds of beads) of magnesium trisilicate having an average particle size of 5 microns in diameter and a slurry pH of 8.8. The glass beads and magnesium trisilicate were intimately mixed together. It was found that the magnesium trisilicate imparted improved free-flow characteristics to the glass beads and that the beads remained free-flowing even when exposed to 65% relative humidity at a temperature of 80° F. for a period of 24 hours or longer.

*Example 4*

Example 3 was repeated using barium sulfate in lieu of magnesium trisilicate, and comparable results were obtained.

*Example 5*

Example 3 was repeated using aluminum silicate in lieu of magnesium trisilicate and comparable results were obtained.

*Example 6*

Example 3 was repeated using titanium dioxide in lieu of magnesium trisilicate and comparable results were obtained.

Example 7

Example 3 was repeated using calcium silicate in lieu of magnesium trisilicate and comparable results were obtained.

Example 8

Example 3 was repeated using tricalcium phosphate in lieu of magnesium trisilicate and comparable results were obtained.

Example 9

A composition for imparting free-flow characteristics to glass beads of small particle size was prepared having the following composition by weight:

| Component: | Percentage by weight |
|---|---|
| Magnesium aluminum silicate | 90 |
| Silicon dioxide | 10 |

The magnesium aluminum silicate employed had an average particle size of 0.14 micron in diameter and a slurry pH of 7.5. The silicon dioxide employed had an average particle size ranging between 0.4 and 5 microns in diameter and a slurry pH of 3.7. The above components were intimately admixed together.

Example 10

Example 9 was followed in preparing a composition having the following percentage by weight composition:

| Component: | Percentage by weight |
|---|---|
| Megnesium aluminum silicate | 60 |
| Silicon dioxide | 40 |

The magnesium aluminum silicate employed had an average particle size of 0.32 micron in diameter and a slurry pH of 7.3. The silicon dioxide employed had an average particle size ranging between 0.4 and 5 microns in diameter and a slurry pH of 3.7.

Example 11

Example 9 was followed in preparing a composition having the following percentage by weight composition:

| Component: | Percentage by weight |
|---|---|
| Magnesium aluminum silicate | 95 |
| Silicon dioxide | 5 |

The magnesium aluminum silicate employed had an average particle size of 0.14 micron in diameter and a slurry pH of 7.5. The silicon dioxide had an average particle size of 5 microns in diameter and a slurry pH of 3.7.

Example 12

To a quantity of glass beads was added 0.01% by weight, based on the weight of the glass beads, of the composition of Example 9 to obtain substantially dry glass beads of small particle size having improved free-flow characteristics. The glass beads and the composition of Example 9 were intimately mixed together. It was found that the resulting glass beads exhibited excellent free-flow characteristics even though exposed to humid atmospheric conditions.

Example 13

To a quantity of glass beads was added 0.01% by weight, based on the weight of the glass beads, of the composition of Example 10 to obtain substantially dry glass beads of small particle size having improved free-flow characteristics. The glass beads and the composition of Example 10 were intimately mixed together. It was found that the resulting glass beads exhibited excellent free-flow characteristics even though exposed to humid atmospheric conditions.

Example 14

To a quantity of glass beads was added 0.1% by weight, based on the weight of the glass beads, of the composition of Example 11 to obtain substantially dry glass beads of small particle size having improved free-flow characteristics. The glass beads and the composition of Example 11 were intimately mixed together. It was found that the resulting glass beads exhibited excellent free-flow characteristics even though exposed to humid atmospheric conditions.

Example 15

In order to demonstrate the effect of the materials used in practicing the invention on the surface pH characteristics of small glass beads, the pH of a slurry of untreated glass beads and of beads treated with excessive amounts of the composition of Example 9 was determined, the pH values being determined by the slurry method.

The pH of a slurry formed by adding distilled water to 10 grams of untreated glass beads of small particle size (less than 900 microns in diameter) was found to be 11.5. The pH of a slurry formed by adding distilled water to a mixture of 9.5 grams of beads and 0.5 gram of the composition of Example 9 was found to be 9.6. The pH of a slurry formed by adding distilled water to a mixture of 9 grams of beads and 1.0 gram of the composition of Example 9 was found to be 9.4. The pH of a slurry formed by adding distilled water to a mixture of 7.5 grams of beads and 2.5 grams of the composition of Example 9 was found to be 8.8.

The above tests demonstrate the effect of the composition of Example 9 on the pH value of glass beads, with the composition of Example 9 being used in excessive amount. However, the same tendency toward neutralization of free alkali on the surface of the glass beads occurs, and improved free-flow characteristics are imparted to the beads, when smaller amounts of the materials having the above-noted properties are employed as shown in Examples 1–8 and 12–14.

In view of the above, it will be seen that the several objects of the invention are achieved and other advantageous results attained.

As various changes could be made to the above methods and products without departing from the scope of the invention, it is intended that all matter contained in the above description shall be interpreted as illustrative and not in a limiting sense.

What is claimed is:

1. The method of maintaining the free-flow characteristics of substantially dry glass beads of small particle size which comprises adding to said beads between approximately 0.01% and 0.1% by weight, based upon the weight of the glass beads, of a finely divided, nonhygroscopic, inorganic material having a slurry pH of less than approximately 9.0, and intimately mixing said beads and said material together.

2. The method of maintaining the free-flow characteristics of substantially dry glass beads of an average particle size not greater than approximately 900 microns in diameter which comprises adding to said beads between approximately 0.01% and 0.1% by weight, based upon the weight of the glass beads, of a nonhygroscopic, inorganic material having a slurry pH of less than approximately 9.0 and an average particle size of less than 15 microns in diameter, and intimately mixing said beads and said material together.

3. The method of maintaining the free-flow characteristics of substantially dry glass beads of an average particle size not greater than approximately 900 microns in diameter which comprises adding to said beads between approximately 0.01% and 0.1% by weight, based upon the weight of the glass beads, of a nonhygroscopic, inorganic material having a slurry pH of less than approximately 9.0 and an average particle size of less than approximately 15 microns in diameter, said material being selected from the group consisting of magnesium aluminum silicate, silicon dioxide, barium sulfate, magnesium trisilicate, aluminum silicate, titanium dioxide, calcium silicate, tricalcium phosphate and mixtures thereof, and intimately mixing said beads and said material together.

4. The method of maintaining the free-flow characteristics of substantially dry glass beads of an average particle size not greater than approximately 900 microns in diameter which comprises adding to said beads between approximately 0.01% and 0.1% by weight, based upon the weight of the glass beads, of a nonhydroscopic, inorganic material having a slurry pH of less than approximately 9.0 and an average particle size of less than approximately 5 microns in diameter, said material being selected from the group consisting of magnesium aluminum silicate, silicon dioxide, barium sulfate, magnesium trisilicate, aluminum silicate, titanium dioxide, calcium silicate, tricalcium phosphate and mixtures thereof, and intimately mixing said beads and said material together.

5. The method of maintaining the free-flow characteristics of substantially dry glass beads of an average particle size not greater than approximately 900 microns in diameter which comprises adding to said beads between approximately 0.01% and 0.1% by weight, based upon the weight of the glass beads, of magnesium aluminum silicate having an average particle size of not greater than 5 microns in diameter, and intimately mixing said glass beads and magnesium aluminum silicate together.

6. The method of maintaining the free-flow characteristics of substantially dry glass beads of an average particle size not greater than approximately 900 microns in diameter which comprises adding to said beads between approximately 0.01% and 0.1% by weight, based upon the weight of the glass beads, of silicon dioxide having an average particle size of not greater than 5 microns in diameter, and intimately mixing said glass beads and silicon dioxide together.

7. The method of maintaining the free-flow characteristics of substantially dry glass beads of an average particle size not greater than approximately 900 microns in diameter which comprises adding to said beads between approximately 0.01% and 0.1% by weight, based upon the weight of the glass beads, of a mixture comprising between approximately 60% and 95% by weight of magnesium aluminum silicate having an average particle size of not greater than 0.32 micron in diameter and between approximately 5% and 40% by weight of silicon dioxide having an average particle size of not greater than 5 microns in diameter, and intimately mixing said glass beads and said mixture together.

8. Substantially dry glass beads of small particle size normally subject to adsorption of moisture and having improved free-flow characteristics imparted thereto under conditions of moisture, said beads having intermixed therewith between approximately 0.01% and 0.1% by weight, based upon the weight of the glass beads, of a finely divided nonhygroscopic, inorganic material having a slurry pH of less than approximately 9.0, said material being of substantially smaller particle size than that of the glass beads.

9. Substantially dry glass beads of an average particle size not greater than approximately 900 microns in diameter normally subject to adsorption of moisture and having improved free-flow characteristics imparted thereto under conditions of moisture, said beads having intermixed therewith between 0.01% and 0.1% by weight, based upon the weight of the glass beads, of a nonhygroscopic, inorganic material having a slurry pH of less than approximately 9.0 and an average particle size of less than 15 microns in diameter.

10. Substantially dry glass beads of an average particle size not greater than approximately 900 microns in diameter normally subject to adsorption of moisture and having improved free-flow characteristics imparted thereto under conditions of moisture, said beads having intermixed therewith between 0.01% and 0.1% by weight, based upon the weight of the glass beads, of a nonhygroscopic, inorganic material having a slurry pH of less than approximately 9.0 and an average particle size of less than approximately 15 microns in diameter, said material being selected from the group consisting of magnesium aluminum silicate, silicon dioxide, barium sulfate, magnesium trisilicate, aluminum silicate, titanium dioxide, calcium silicate, tricalcium phosphate and mixtures thereof.

11. Substantially dry glass beads of an average particle size not greater than approximately 900 microns in diameter normally subject to adsorption of moisture and having improved free-flow characteristics imparted thereto under conditions of moisture, said beads having intermixed therewith between approximately 0.01% and 0.1% by weight, based upon the weight of the glass beads, of a nonhygroscopic, inorganic material having a slurry pH of less than approximately 9.0 and an average particle size of less than approximately 5 microns in diameter, said material being selected from the group consisting of magnesium aluminum silicate, silicon dioxide, barium sulfate, magnesium trisilicate, aluminum silicate, titanium dioxide, calcium silicate, tricalcium phosphate and mixtures thereof.

12. Substantially dry glass beads of an average particle size not greater than approximately 900 microns in diameter normally subject to adsorption of moisture and having improved free-flow characteristics imparted thereto under conditions of moisture, said beads having intermixed therewith between approximately 0.01% and 0.1% by weight, based upon the weight of the glass beads, of magnesium aluminum silicate having an average particle size of not greater than 5 microns in diameter.

13. Substantially dry glass beads of an average particle size not greater than approximately 900 microns in diameter normally subject to adsorption of moisture and having improved free-flow characteristics imparted thereto under conditions of moisture, said beads having intermixed therewith between approximately 0.01% and 0.1% by weight, based upon the weight of the glass beads, of silicon dioxide having an average particle size of not greater than 5 microns in diameter.

14. Substantially dry glass beads of an average particle size not greater than approximately 900 microns in diameter normally subject to adsorption of moisture and having improved free-flow characteristics imparted thereto under conditions of moisture, said beads having intermixed therewith between approximately 0.01% and 0.1% by weight, based upon the weight of the glass beads, of a mixture comprising between approximately 60% and 95% by weight of magnesium aluminum silicate having an average particle size of not greater than 0.32 micron in diameter and between approximately 5% and 40% by weight of silicon dioxide having an average particle size of not greater than 5 microns in diameter.

15. A composition for imparting free-flow characteristics to substantially dry glass beads of small particle size comprising between approximately 60% and 95% by weight of finely divided particles of magnesium aluminum silicate and between approximately 5% and 40% by weight of finely divided particles of silicon dioxide, said particles of magnesium alumimun silicate and silicon dioxide being of substantially smaller particle size than that of said glass beads.

16. A composition for imparting free-flow characteristics to substantially dry glass beads of small particle size comprising between approximately 60% and 95% by weight of magnesium aluminum silicate having an average particle size of not greater than 0.32 micron in diameter and between 5% and 40% by weight of silicon dioxide having an average particle size of not greater than 5 microns in diameter.

17. A composition for imparting free-flow characteristic to substantially dry glass beads of small particle size not greater than approximately 900 microns in diameter comprising approximately 90% by weight of magnesium aluminum silicate having an average particle size of not greater than 0.32 micron in diameter and approximately 10% by weight of silicon dioxide having an average particle size of not greater than 5 microns in diameter.

18. A composition for imparting free-flow characteristics to substantially dry glass beads of a particle size not greater than 500 microns in diameter comprising approximately 90% by weight of magnesium aluminum silicate having an average particle size of approximately 0.32 micron in diameter and approximately 10% by weight of silicon dioxide having an average particle size of approximately 5 microns in diameter.

References Cited by the Examiner
UNITED STATES PATENTS

| | | |
|---|---|---|
| 1,574,131 | 2/1926 | Smith. |
| 1,865,733 | 7/1932 | Warning et al. _____ 252—385 |
| 1,966,513 | 7/1934 | Moss et al. _____ 252—385 |
| 2,104,619 | 1/1938 | Lehmann _____ 252—385 |
| 2,625,514 | 1/1953 | Kirschenbauer _____ 252—385 |
| 3,085,944 | 4/1963 | Valentine _____ 252—385 |
| 3,141,882 | 7/1964 | Franz _____ 252—385 |
| 3,143,410 | 8/1964 | Smith _____ 252—385 |
| 3,177,083 | 4/1965 | De Vries _____ 65—21 |

TOBIAS E. LEVOW, *Primary Examiner.*

J. POER, S. E. MOTT, *Assistant Examiners.*